(No Model.)
W. YOUNG.
POTATO DIGGER.
No. 357,260. Patented Feb. 8, 1887.
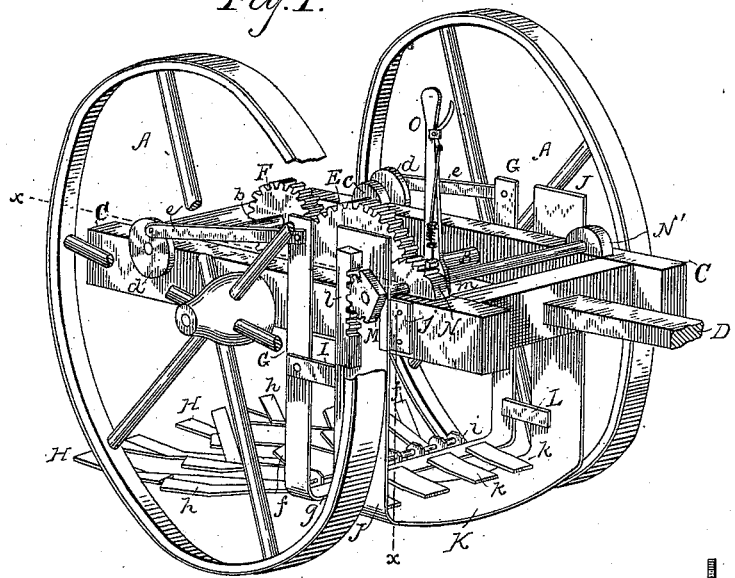
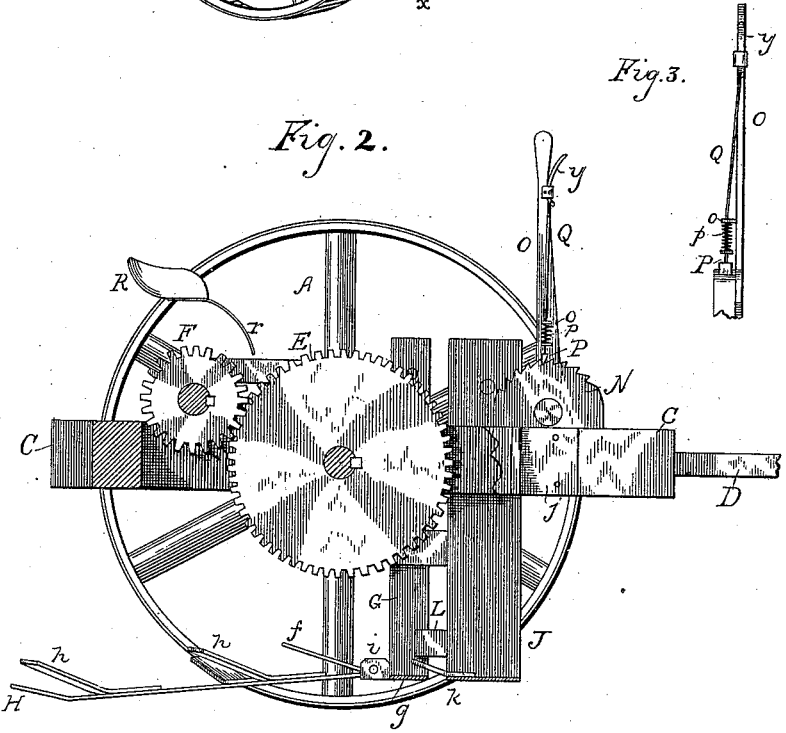
Witnesses
Preston Phelps.
M. D. Peck
Inventor
Wilfred Young,
By his Attorneys
Duell and Benedict

UNITED STATES PATENT OFFICE.

WILFRED YOUNG, OF EAST HOMER, NEW YORK.

POTATO-DIGGER.

SPECIFICATION forming part of Letters Patent No. 357,260, dated February 8, 1887.

Application filed October 21, 1886. Serial No. 216,804. (No model.)

*To all whom it may concern:*

Be it known that I, WILFRED YOUNG, a citizen of the United States, residing at East Homer, in the county of Cortland and State of New York, have invented certain new and useful Improvements in Potato-Diggers; and I do hereby declare the following to be a full, clear, and exact description of the invention, such as will enable others skilled in the art to which it appertains to make and use the same, reference being had to the accompanying drawings, which form part of this specification.

This invention relates to certain new and useful improvements in potato-diggers, and has for its object a more simple and complete device for plowing or scooping up the hills and separating the dirt from the potatoes than has heretofore been used; and it consists in the peculiar construction and arrangement of its parts, as hereinafter described, and more particularly pointed out in the claims.

By reference to the drawings, Figure 1 represents a perspective view of my machine, in which is shown my special improvements. Fig. 2 is a vertical sectional view on the line $x$ $x$ of Fig. 1, partially broken away to show the gearing and attachments of parts; and Fig. 3 is a detail view of the hand-lever and detent.

Like characters refer to corresponding parts in each figure of the drawings.

A represents the wheels of the device. B is the axle on which the wheels revolve, and C is a rectangular frame or body placed between the wheels, extending at substantially the same distance front and back, through which the axle extends upon which the frame or body rests.

In the center of the front end of the frame C there is attached a draft-pole, D. To the center of axle B there is rigidly secured a large cog-wheel, E, which meshes with one of smaller size, F, rigidly secured on a revolving shaft, $b$, held by keepers $c$ on the top and near the rear end of the frame.

On each end of shaft $b$, which extends beyond the sides of the frame C, is attached a crank-wheel, $d$, having a crank arm or pin in one side thereof, to which pitman-rods $e$ are eccentrically attached at one end and extended forward from the wheels $d$ over the front of the axle B, where the other end is pivotally attached to the top of adjustable shaker-bars G. The shaker-bars extend downward to near the bottom of the wheels A, and are united by a cross-bar, $g$, at their lower ends. There are rigidly secured to the cross-bar $g$ fingers $f$, which extend slightly upward and backward, and between the fingers there are pivot-eyes $i$ on the rear portion of the bearing-plate, in which there are separately-pivoted finger-arms H, forming a screen which extends back beyond the frame and wheels, and have their rear ends inclined upward.

On the sides of the finger-arms there are projecting wings $h$, which, when the machine is in operation, are thrown up and down with the finger-arms as they are drawn or trailed over the uneven surface, and the clods of dirt are broken by them and shaken through the screen, while the potatoes gradually fall off and are collected on the surface.

About midway of the vertical shaker-bars G there are loosely pivoted at one end connecting-bars I, which are at right angles with bars G, the other end of which extends forward and is rigidly secured to adjustable plow-bars J, which are adapted to be moved up and down in ways $j$ on the sides of the frame C. The bars J are continued at their lower ends, forming an integral connection, one with the other, by a scoop plow-blade, K, which is slightly concave from side to side on its upper surface, extending forward and downward, having a dull front edge adapted to be drawn under the row or hills of the row when in operation.

On the rear portion of the plow-blade K there are rigidly-attached fingers $k$, which extend upward and back over the front edge of the cross-bar $g$, to throw the substance of the hills or row over onto the pivoted finger-arms H, as it is scooped or scraped up by the plow-blade K. Just above the plow-blade, and on the inner side of the bars J, there are rigidly-attached guides L, which extend backward upon the inner side of the shaker-bars G to keep them in place when the machine is in operation and while being adjusted.

Near the upper end and on the outer side of the plow-bars J there are secured vertical racks $l$, which are engaged by segment-wheels M on the ends of a shaft, $m$, near the front, and secured to the upper side of the frame C by means of boxes N N'. The upper side of box N forms a segment-gear to hold the detent.

On the shaft m, within the inner side of the frame, there is rigidly fastened a lever-arm, O, which extends upward and has secured to its side a detent, P. The detent is held in position on the segment-gear N by means of a coiled spring, p, working against a perforated lug, o, attached to the side of the lever-arm, through which the connecting-rod Q of the detent passes. Near the upper end of the arm the rod is connected with a hand-lever, y, by which the detent is raised from the segment-gear N when it is desired to turn the lever O in raising or lowering the scoop-plow blade K and the front ends of the finger-arms H.

A seat, R, may be attached to the frame C by means of one or more curved springs, r, in any desirable way.

In operation the scraper plow-blade K is adjusted to the desired height by means of the lever-arm on the shaft operating on the rack or bar J, and is held in position by the detent, the degree of adjustment depending upon the depth of furrow between the hills or rows in which the wheels travel. This adjustment also regulates that of the shaker-bars G and the height of the front ends of the finger-arms H. In motion the power transmitted through the large cog-wheel E, which is rigidly attached to the axle as it meshes with the smaller cog-wheel, F, on the revolving shaft b, turns the crank-wheel d, which throws the pitman-rod e forward and backward, carrying with it the upper ends of the loosely-pivoted shaker-bars G, having the finger-arms H attached to their uniting cross-bar g below, thereby producing a movement that shakes the screen or finger-arms from front to back, or on a line with the travel of the machine, which requires a much lower rate of speed in accomplishing the same work than in a device adapted to shake the screen in a lateral direction to the movement of the machine. As the dirt and small stones, together with the potatoes, are thrown over the scraper-blade K upon the finger-arms, the projecting wings h quickly break up the clogs of dirt, and the irregular vertical motion, together with the front-and-back movement of the finger-arms, rapidly screens the dirt and leaves the potatoes on the surface of the ground for collection.

Having fully described my invention, what I claim as new, and desire to secure by Letters Patent of the United States, is—

1. In a potato-digger, a cog-wheel secured to the axle and meshing with one on a shaft attached to the rear part of a frame resting thereon, said shaft having crank-wheels with pitmen attached to vertical shaker-bars in front of the axle, the shaker-bars being pivoted at about their centers to adjustable plow-bars and their lower ends forming the front end of the screen and adapted to shake the screen back and forth on the line of draft of the machine, as set forth.

2. In a potato-digger, the combination of a cog-wheel rigidly secured to the axle and meshing with a pinion on a shaft attached to the frame, said shaft having crank-wheels with pitmen loosely pivoted to vertical centrally-pivoted shaker-bars adapted to be adjusted to raise or lower the screen, as and for the purpose set forth and described.

3. In a potato-digger drawn on wheels, transmitting power through cog-wheels from the axle to a shaft secured to the frame, the combination of a crank attachment provided with a pitman attached to a vertical centrally-pivoted shaker-bar carrying separately-pivoted finger-arms, as and for the purpose set forth.

4. In a potato-digger, centrally-pivoted shaker-arms united by a cross-bar at their lower ends and having separately-pivoted finger-arms secured thereto, provided with projecting wings on their sides, as and for the purpose set forth.

5. In a potato-digger, a screen consisting of a cross-bar uniting the lower ends of shaker-arms, said cross-bar having fingers rigidly attached thereto alternating with separately-pivoted finger-arms with projecting wings on their sides, as and for the purpose set forth.

6. In a potato-digger, a scoop plow-blade integral with and uniting the lower ends of adjustable bars and having fingers rigidly attached thereto and extending upward and back over the front of the cross-bar to which the screen is attached, as and for the purpose set forth.

7. A scoop plow-blade having fingers rigidly attached thereto, the blade being integral with side bars having guides for the shaker-bars on their inner sides, in combination with shaker-bars pivotally connected to the side bars and on the outside of the guides, both sets of bars adapted to be adjusted up or down by the movement of a single lever, as and for the purpose set forth.

8. The combination, with side bars united at their lower ends by a scoop plow-blade having pivotally-secured shaker-bars at their sides, of a rack on the side bars engaged by a segment-wheel and operated by a lever on a shaft to adjust the plow-blade and shaker-bars up and down, at the same time to hold the adjusted parts in position, as and for the purpose set forth.

In testimony whereof I affix my signature in presence of two witnesses.

WILFRED YOUNG.

Witnesses:
R. H. DUELL,
SAMUEL KEATER.